US005614667A

United States Patent [19]

Hosoya

[11] Patent Number: 5,614,667

[45] Date of Patent: Mar. 25, 1997

[54] METHOD AND APPARATUS FOR CONTROLLING THROTTLE VALVE CONTAMINATION LEARNING

[75] Inventor: Hajime Hosoya, Atsugi, Japan

[73] Assignee: Unisia Jecs Corporation, Kanagawa-ken, Japan

[21] Appl. No.: 594,060

[22] Filed: Jan. 30, 1996

[30] Foreign Application Priority Data

Feb. 2, 1995 [JP] Japan .................................. 7-016114

[51] Int. Cl.[6] .......................... F02D 45/00; G01M 15/00

[52] U.S. Cl. ................ 73/118.2; 73/117.3; 364/431.051

[58] Field of Search .......................... 73/115, 116, 117.2, 73/117.3, 118.1, 118.2, 202.5, 204.11, 204.14, 204.17; 364/431.04, 431.05

[56] References Cited

U.S. PATENT DOCUMENTS

| | | | |
|---|---|---|---|
| 4,437,340 | 3/1984 | Csere et al. | 73/118.2 |
| 5,008,824 | 4/1991 | Clark et al. | 73/118.2 |
| 5,012,422 | 4/1991 | Takahashi et al. | 364/431.05 |
| 5,270,935 | 12/1993 | Dudek et al. | 364/431.05 |
| 5,293,553 | 3/1994 | Dudek et al. | 364/431.04 |
| 5,377,112 | 12/1994 | Brown et al. | 73/117.3 |
| 5,398,544 | 3/1995 | Lipinski et al. | 73/118.2 |
| 5,423,208 | 6/1995 | Dudek et al. | 73/117.3 |
| 5,465,617 | 11/1995 | Dudek et al. | 73/118.2 |
| 5,546,795 | 8/1996 | Yamagishi et al. | 73/118.2 |

*Primary Examiner*—Richard Chilcot
*Assistant Examiner*—George M. Dombroske
*Attorney, Agent, or Firm*—Lowe, Price, LeBlanc & Becker

[57] ABSTRACT

The invention relates to technology for avoiding the influence of intake air volumetric flow rate changing due to contamination of a throttle valve opening. When the opening of the throttle valve of an internal combustion engine is large, the atmospheric pressure is estimated based on, the intake air volumetric flow rate which is estimated based on the throttle valve opening, and on a separately detected intake air mass flow rate. After this, within a predetermined time for example, when the opening of the throttle valve changes to a small opening while the atmospheric pressure is virtually constant, the atmospheric pressure is similarly estimated based on the estimated intake air volumetric flow rate and on the detected intake air mass flow rate. A relationship between the throttle valve opening and a value related to the throttle valve opening is then learned and corrected so that the latter estimated atmospheric pressure which is influenced by contamination of the throttle valve approaches the former estimated atmospheric pressure of high reliability which is not influenced by contamination of the throttle valve.

As a result, the atmospheric pressure can be estimated to good accuracy even when the throttle valve is maintained in the low opening region. In addition, the performance of the various controls based on the throttle valve opening can be improved.

12 Claims, 6 Drawing Sheets

METHOD AND APPARATUS FOR CONTROLLING THROTTLE VALVE CONTAMINATION LEARNING

(1) FIELD OF THE INVENTION

The present invention relates to technology for avoiding the influence of intake air volumetric flow rate changing due to contamination of a throttle valve disposed in an intake system of an internal combustion engine.

(2) DESCRIPTION OF THE RELATED ART

With internal combustion engines such as gasoline engines, a throttle valve is disposed in the intake system, and the opening of this throttle valve is used as an input at the time of computing the intake air volumetric flow rate.

However, if the throttle valve becomes contaminated with dust sticking thereto, then an error arises in the intake air volumetric flow rate computed for the throttle valve opening. This error presents no problem at the time of large throttle valve openings, since it is only a small percentage of the intake air volumetric flow rate. However, at the time of low openings such as during idling, there is a problem since the error is then a larger percentage of the intake air volumetric flow rate.

To address this problem, there has heretofore been an arrangement wherein throttle valve openings corresponding to output values of a throttle sensor are learned and corrected so that a volumetric flow rate of the intake air computed during idling and an intake air mass flow rate detected by an air flow meter become equivalent.

However, when in this way learning is carried out in the low opening regions of the throttle valve, so that the volumetric flow rate and the mass flow rate become equivalent, then in the low opening regions of throttle valve opening it becomes impossible for example to estimate atmospheric pressure based on a comparison of the intake air volumetric flow rate detected by the throttle valve opening, and the intake air mass flow rate detected by the air flow meter. Hence particularly under conditions where the throttle valve opening continues at a small value, such as during travelling on a down slope, travelling proceeds with atmospheric pressure unable to be estimated.

As a result, for example with the speed change pattern of an automatic transmission which is switched in accordance with the atmospheric pressure so as to suppress the likelihood of a shift to the high speed side at high altitude regions due to an increase in throttle valve opening resulting from a drop in atmospheric pressure, the atmospheric pressure cannot be estimated. Hence the relevant switching cannot be carried out, thus having a detrimental influence on speed change control.

Moreover, there is an arrangement wherein at the time of transitional operation of the engine, the correction amount for the fuel injection quantity during transition is set in accordance with the rate of change of the opening of the throttle valve or of the throttle opening area determined from the throttle valve opening. In this case, the rate of change of the throttle valve opening or of the opening area are used to obtain the change in intake air volumetric flow rate so as to set the correction amount for the fuel injection quantity in accordance with this change. However, with learning to cater for contamination of the throttle valve, wherein the volumetric flow rate is made equivalent to the mass flow rate, the throttle valve opening no longer corresponds to the intake air volumetric flow rate. Hence the correction amount for the fuel injection quantity during transition cannot be appropriately set. Also, in the case wherein the learning to cater for contamination of the throttle valve is interrupted, since at low openings the intake air volumetric flow rate is changed due to contamination, then similarly the correction amount for the fuel injection quantity during transition cannot be appropriately set.

SUMMARY OF THE INVENTION

The present invention takes into consideration the above problems with the conventional arrangements with the object of eliminating the influence of contamination of the throttle valve, even in low opening regions of throttle valve opening, by learning and correcting contamination of the throttle valve based on intake air volumetric flow rates, so that the intake air volumetric flow rate can be obtained from the throttle valve opening.

Moreover, as a consequence it is an object to be able to estimate the atmospheric pressure with good accuracy even in low opening regions of the throttle valve.

Furthermore, it is an object to be able to suitably maintain the performance of various controls which are based on the throttle valve opening.

Accordingly the method (and apparatus) according the present invention for controlling throttle valve contamination learning for an internal combustion engine includes; respectively detecting intake air mass flow rate, the opening of a throttle valve disposed in the engine intake system, and engine rotational speed (by an intake air mass flow rate detection device, a throttle valve opening detection device, and an engine rotational speed detection device), estimating intake air volumetric flow rate (by an intake air volumetric flow rate estimation device), based on the detected throttle valve opening and engine rotational speed, estimating atmospheric pressure (by an atmospheric pressure estimation device which estimates atmospheric pressure from the intake air mass flow rate and the intake air volumetric flow rate) at the time of a large value for the detected throttle valve opening, based on the detected intake air mass flow rate and the estimated intake air volumetric flow rate, estimating atmospheric pressure (by the beforementioned atmospheric pressure estimation device) when the throttle valve opening subsequently changes to a small value while the atmospheric pressure remains virtually constant, based on the detected intake air mass flow rate and the estimated intake air volumetric flow rate, and learning and correcting (by a learning device) a relationship between the throttle valve opening and a value related to the throttle valve opening, so that the atmospheric pressure estimated when the throttle valve opening changes to a small value while the atmospheric pressure remains virtually constant, approaches the atmospheric pressure estimated when the throttle valve opening is a large value.

More specifically, when the opening of the throttle valve is large, then even in the case of contamination on the throttle valve, the influence on the intake air volumetric flow rate can be disregarded. Therefore atmospheric pressure estimation can be carried out to high reliability at the time of high openings of the throttle valve, based on the highly reliable intake air volumetric flow rate estimated by the intake air volumetric flow rate estimation device, and the intake air mass flow rate detected by the intake air mass flow rate detection device.

However, in the low opening regions of the throttle valve, the change in the intake air volumetric flow rate due to contamination is large so that a discrepancy corresponding to the change in the intake air volumetric flow rate due to the contamination occurs in the atmospheric pressure estimated by the atmospheric pressure estimation device.

Therefore, when the throttle valve is changed to a low opening while the atmospheric pressure remains virtually constant after estimating the atmospheric pressure in the high opening region of the throttle valve, the relationship between the throttle valve opening and the value related to the throttle valve opening can be corrected to a relationship wherein the influence due to contamination is eliminated, by learning and correcting the relationship so-that the discrepancy in the estimated value for the atmospheric pressure in low opening regions of the throttle valve approaches zero.

Furthermore, the learning and correcting (by the learning device) may be carried out for example, when the opening of the throttle valve changes to a small value within a predetermined period, after estimating the atmospheric pressure when the detected throttle valve opening is a large value.

More specifically, when the throttle valve opening changes to a small value within a predetermined period, after carrying out highly reliable atmospheric pressure estimation when the throttle valve opening is a large value, it can be judged that the atmospheric pressure remains virtually constant. Therefore by carrying out learning under this condition the reliability of learning can be ensured.

Moreover, the arrangement may include; detecting if there are up slope or down slope travelling conditions (by an up slope/down slope travelling conditions detection device), and carrying out learning and correcting when the throttle valve opening changes to a small opening while detected that there are non up slope or down slope travelling conditions, after estimating atmospheric pressure when the detected throttle valve opening is a large value.

Since it can be judged that while detecting that there are non up slope or down slope travelling conditions after carrying out the beforementioned highly reliable atmospheric estimation, there will be no atmospheric pressure changes due to altitude change, then by carrying out learning under these conditions the reliability of learning can be ensured.

In addition, the learning and correcting (by the learning device) may be carried out with respect to a relationship between the throttle valve opening and the intake air volumetric flow rate.

That is to say by making the value related to the throttle valve opening the intake air volumetric flow rate, then even in low opening regions of throttle valve opening, an intake air volumetric flow rate in which influence due to contamination of the throttle valve is eliminated, can be estimated. As a result, atmospheric pressure can be estimated to good accuracy. Hence, even when the throttle valve opening remains in the low opening region for a long period, particularly at the time of down slope or gentle up slope travelling, atmospheric pressure can be estimated to good accuracy.

Furthermore, the learning and correcting (by the learning device) may be carried out with respect to a relationship between the throttle valve opening and a switching point for the speed change position of an automatic transmission.

In this way, by learning and correcting the throttle valve opening used in speed change position switching of an automatic transmission, the influence due to contamination can be avoided, and the switching of the speed change position can be suitably set in accordance with a throttle valve opening which corresponds to a true intake air volumetric flow rate. Hence the speed change control performance can be suitably maintained.

Moreover, the learning and correcting. (by the learning device) may be carried out with respect to a relationship between the throttle valve opening and a switching point for the speed change position of an automatic transmission, or a fuel injection quantity correction amount during transition.

In this way, by learning and correcting the throttle valve opening used in setting the fuel injection quantity correction amount during transition, the influence due to contamination can be avoided and the fuel injection quantity correction amount during transition can be suitably set in accordance with a throttle valve opening which corresponds to a true intake air volumetric flow rate. Hence transition operating performance can be suitably maintained.

DETAILED DESCRIPTION OF THE PREFERRED EMBODIMENTS

As follows is a description of embodiments of the present invention with reference to the drawings.

Figure 1:
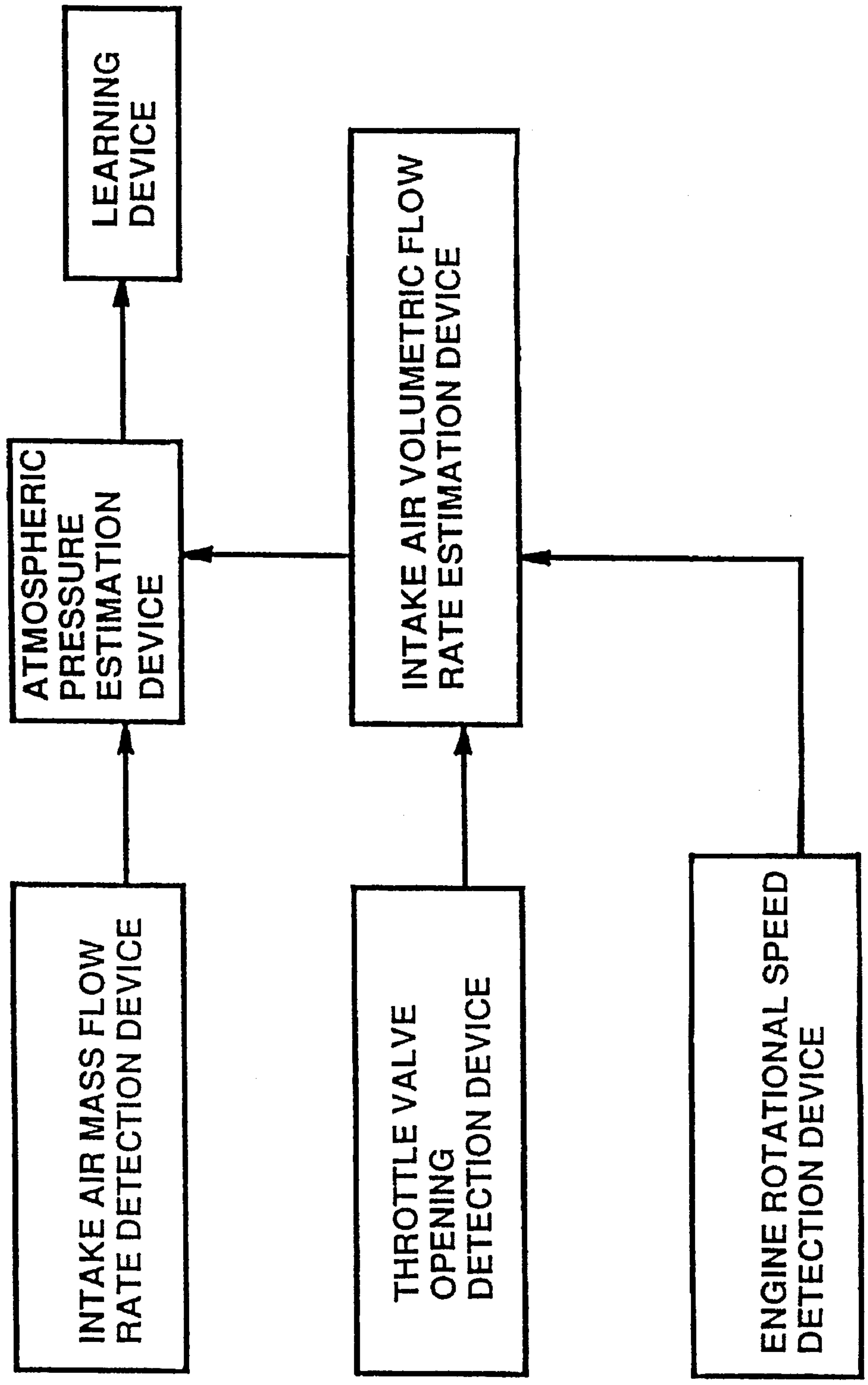
FIG. 1 is a block diagram showing the construction and functions of the present invention.
Figure 2:
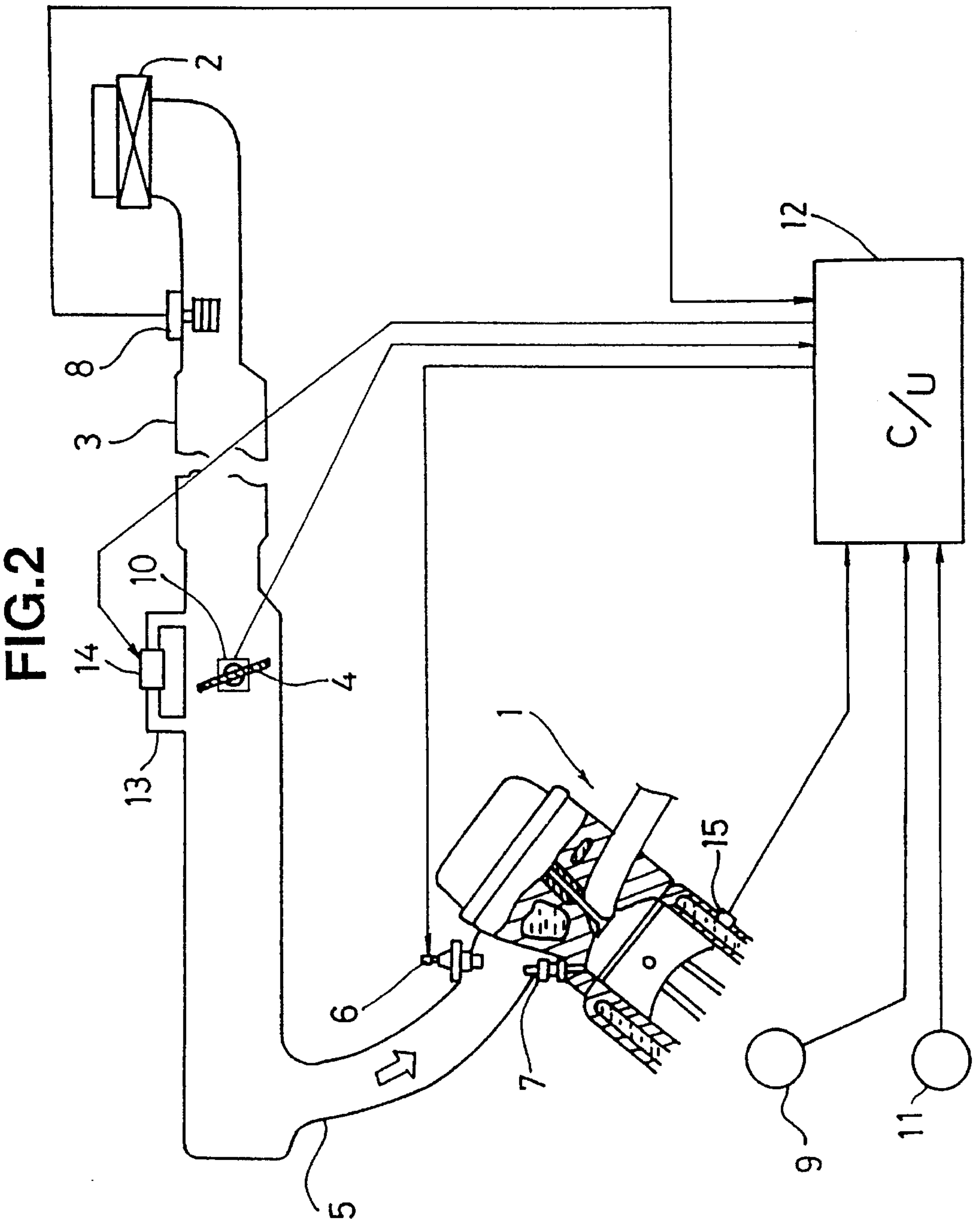
FIG. 2 is a diagram showing a system structure of an embodiment of the present invention.

In FIG. 2 illustrating a first embodiment, air is drawn into an internal combustion engine 1 from an air cleaner 2, by way of an intake duct 3, a throttle valve 4, and an intake manifold 5. Fuel injection valves 6 are provided for each cylinder in respective branch portions of the intake manifold 5.

The fuel injection valves 6 are solenoid type fuel injection valves 6 which open with power to a solenoid and close with power shut-off. The fuel injection valves 6 are intermittently driven open in response to a drive pulse signal of a predetermined pulse width provided by a control unit 12 (to be described later) so that fuel, pressurised by a fuel pump (not shown) and controlled to a predetermined pressure by means of a pressure regulator, is injected to the engine 1.

Ignition plugs 7 are provided for each combustion chamber of the engine 1 for spark ignition of a mixture therein.

For the various sensors for detecting engine operating conditions, there is provided in the intake duct 3, an air flow meter 8 such as a hot wire type air flow meter, which detects an intake air quantity Q of the engine 1 as a mass flow rate. The air flow meter 8 corresponds to the intake air mass flow rate detection device.

Moreover, an engine rotational speed sensor 9 is provided for detecting an engine rotational speed N.

Furthermore, a throttle valve sensor 10 is provided for detecting an opening $\alpha$ of the throttle valve 4, by means of a potentiometer.

In addition there is provided an intake air temperature sensor 11 for detecting the temperature of the intake air.

The control unit 12 incorporates a microcomputer comprising a CPU, ROM, RAM, A/D converter, and input/output interface etc. The control unit 12 takes input signals from the various sensors and controls the pulse width of a drive pulse signal applied to the fuel injection valves 6, as well as setting ignition timing ADV in accordance with engine operating conditions such as engine load and engine rotational speed, and controlling ignition by the ignition plugs 7.

A solenoid type idle control valve 14 is provided in a bypass passage 13 arranged so as to bypass the throttle valve 4. By controlling the opening of the idle control valve 14, the rotational speed at the time of idling can be controlled.

The control unit 12 as described later, learns and corrects changes in the intake air volumetric flow rate in the low opening region of the throttle valve 4 accompanying contamination thereof (referred to hereunder as throttle valve contamination learning), while carrying out estimation of atmospheric pressure in the high opening region of the throttle valve 4.

Figure 3:
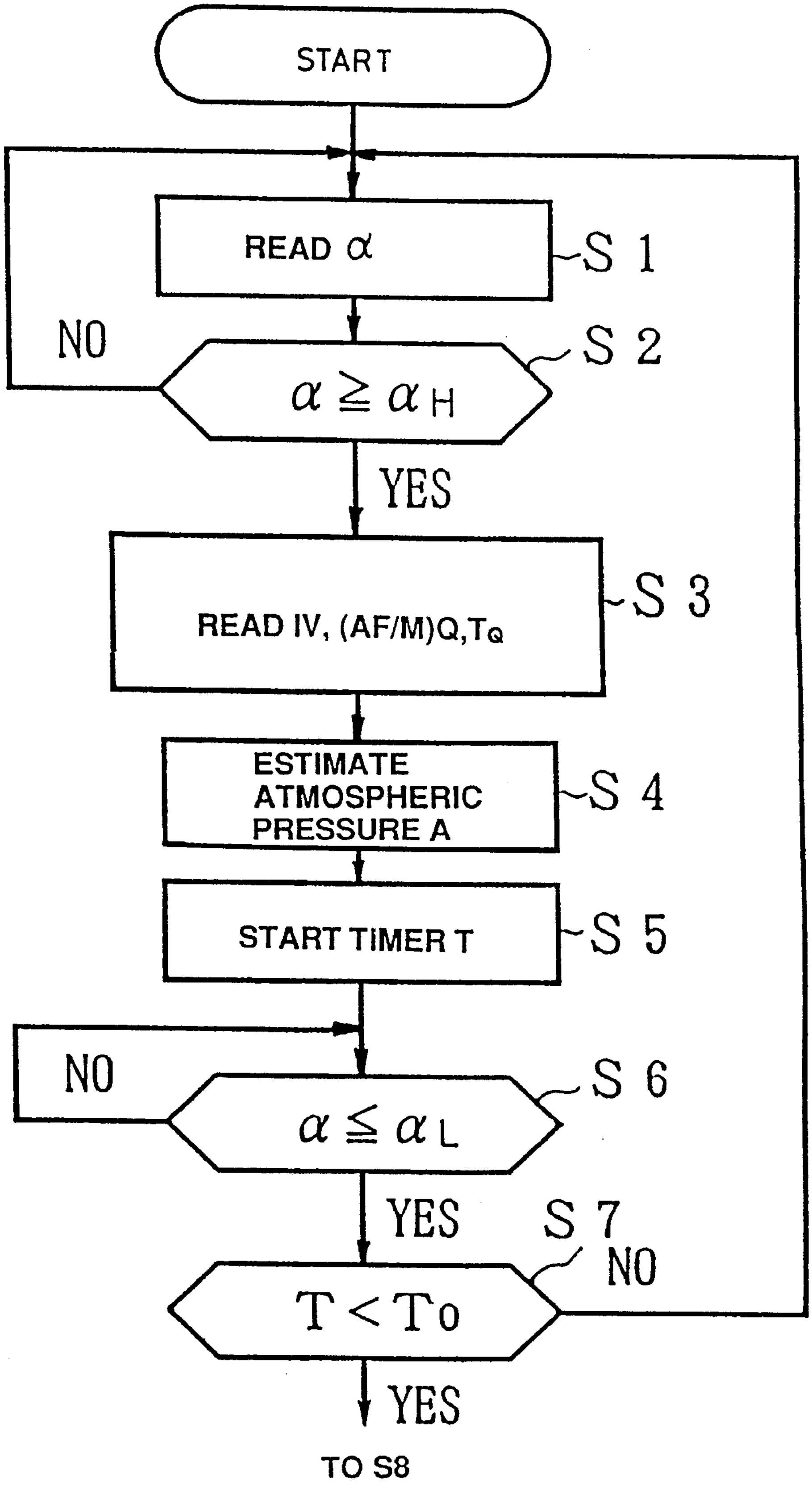
FIG. 3(A) and FIG. 3(B) show a flow chart showing a main routine for a control of the first embodiment.
Figure 3:
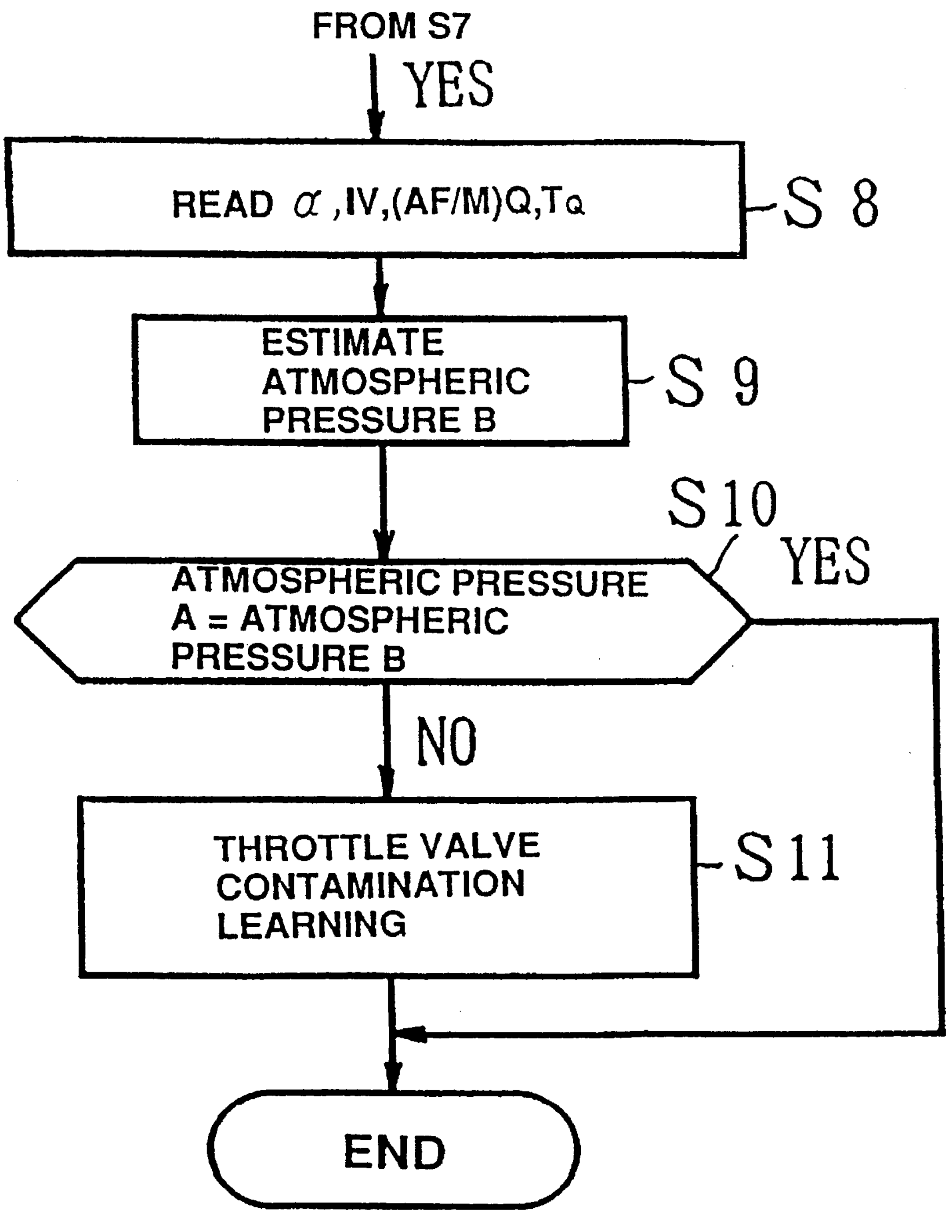

FIG. 3(A) and FIG. 3(B) show a flow chart for a routine for judging whether or not contamination is of a sufficient level to change the volumetric flow rate of the throttle valve.

In FIG. 3(A) and FIG. 3(B), in step 1 (with "step" denoted by S in the figures) a throttle valve opening $\alpha$ is read from the throttle sensor 10.

In step 2, it is judged if the throttle valve opening $\alpha$ is a high opening greater than or equal to a predetermined opening $\alpha_H$.

When a low opening is judged, control returns to step 1, while when a high opening is judged, control proceeds to step 3 where an opening IV of the idle control valve 14 (a control value from the control unit 12), an intake air mass flow rate (AF/M) Q detected by the air flow meter 8, and an intake temperature $T_Q$ detected by the intake air temperature sensor 11 are read.

In step 4, an atmospheric pressure A is estimated/computed according to the following equation, based on the intake air mass flow rate (AF/M) Q, the intake air volumetric flow rate ($\alpha$–N) Q corresponding to the throttle valve opening $\alpha$ and the engine rotational speed N (the function of estimating the intake air volumetric flow rate using $\alpha$ and N corresponds to the intake air volumetric flow rate estimation device), and the intake temperature $T_Q$.

$$A=(AF/M)Q/(\alpha-N)\ Q\times T_Q$$

In step 5, a timer for measuring an elapsed time T from after carrying out estimation/computation of the atmospheric pressure, is started.

In step 6, it is judged if the throttle valve opening $\alpha$ has changed to a low opening less than or equal to a predetermined opening $\alpha_L$.

When the throttle valve opening $\alpha$ has changed to the low opening, control proceeds to step 7, where it is judged if the elapsed time T has reached a time $T_0$ of a duration such that atmospheric pressure could change due to ascent or descent. When this time is reached, control returns to step 1 to cancel the contamination learning and correction, while when not yet reached, control proceeds to step 8.

In step 8, the throttle valve opening $\alpha$, the idle control valve opening IV, the intake air mass flow rate (AF/M) Q and the intake air temperature $T_Q$ are read.

In step 9, an atmospheric pressure B for low opening regions of the throttle valve opening $\alpha$, is estimated using a similar computation method to that of step 4.

Then in step 10, the atmospheric pressure A computed in step 4 for the high opening region is compared with the atmospheric pressure B computed in step 9 for the low opening region, to judge if both are in agreement.

When judged in step 10 that the atmospheric pressure A and the atmospheric pressure B are in agreement, it is judged that contamination has not occurred in the throttle valve 4 to a level sufficient to change the volumetric flow rate, and the routine is terminated. When the atmospheric pressure A and the atmospheric pressure B are not in agreement, it is judged that contamination has occurred in the throttle valve 4 to a level sufficient to change the volumetric flow rate, and control proceeds to step 11 where throttle valve contamination learning, to be described later, is carried out so as to correct the volumetric flow rate which has been changed due to contamination of the throttle valve.

The functions of step 4 and step 9 correspond to the atmospheric pressure estimation device, while step 11 (covered by the respective routines of FIG. 4–FIG. 6 to be described later) corresponds to the learning device.

Figure 4:
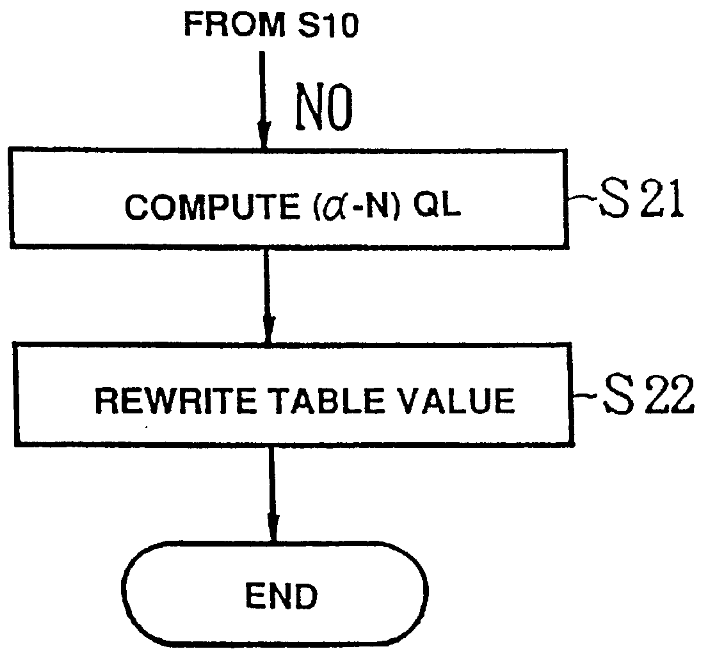
FIG. 4 is a flow chart showing a subroutine for a first learning mode for throttle valve contamination learning.

FIG. 4 is a flow chart showing a first mode for throttle valve contamination learning.

In step 21, an intake air volumetric flow rate ($\alpha$–N) Q for the low opening region of the throttle valve, is corrected so that the atmospheric pressure B computed for the low opening region is in agreement with the atmospheric pressure A computed for the high opening region. More specifically, since in the high opening region of the throttle valve, the change in the intake air volumetric flow rate due to contamination of the throttle valve is small enough to be disregarded, then the atmospheric pressure A estimated at the high opening region, based on this intake air volumetric flow rate is reliable. Hence since an atmospheric pressure B' estimated based on a true intake air volumetric flow rate ($\alpha$–N) $Q_L$ which has been influenced by contamination of the throttle valve will be equal to the atmospheric pressure A, then this true intake air volumetric flow rate ($\alpha$–N) $Q_L$ can be obtained from the following equation.

$$(\alpha-N)\ Q_L=\{(AF/M)Q_L\cdot T_{QL}\cdot(\alpha-N)\ Q_H\}/\{(AF/M)\ Q_H\cdot T_{QH}\}$$

where subscript H indicates the value for the high opening region of the throttle valve, while subscript L indicates the value for the low opening region of the throttle valve.

In step 22, the relevant value in a throttle valve low opening $\alpha$–N region in a map or table of ($\alpha$–N) Q, is rewritten with the true intake air volumetric flow rate ($\alpha$–N) $Q_L$ computed in step 21.

By carrying out such learning, then even under extended periods of driving with a low throttle valve opening, such as at the time of down slope travelling or gentle up slope travelling, atmospheric pressure estimation can be carried out using a true intake air volumetric flow rate for which the influence due to contamination has been learnt and corrected. Therefore good speed change control performance of an automatic transmission can be ensured by switching the speed change pattern based on the estimated atmospheric pressure, and good engine control can be carried out by appropriately setting the correction amount of the fuel injection quantity during transition.

In this learning mode, the intake air volumetric flow rate for the low opening region of the throttle valve is learnt and corrected. However it is possible to learn and correct the opening characteristics of the throttle valve.

Figure 5:
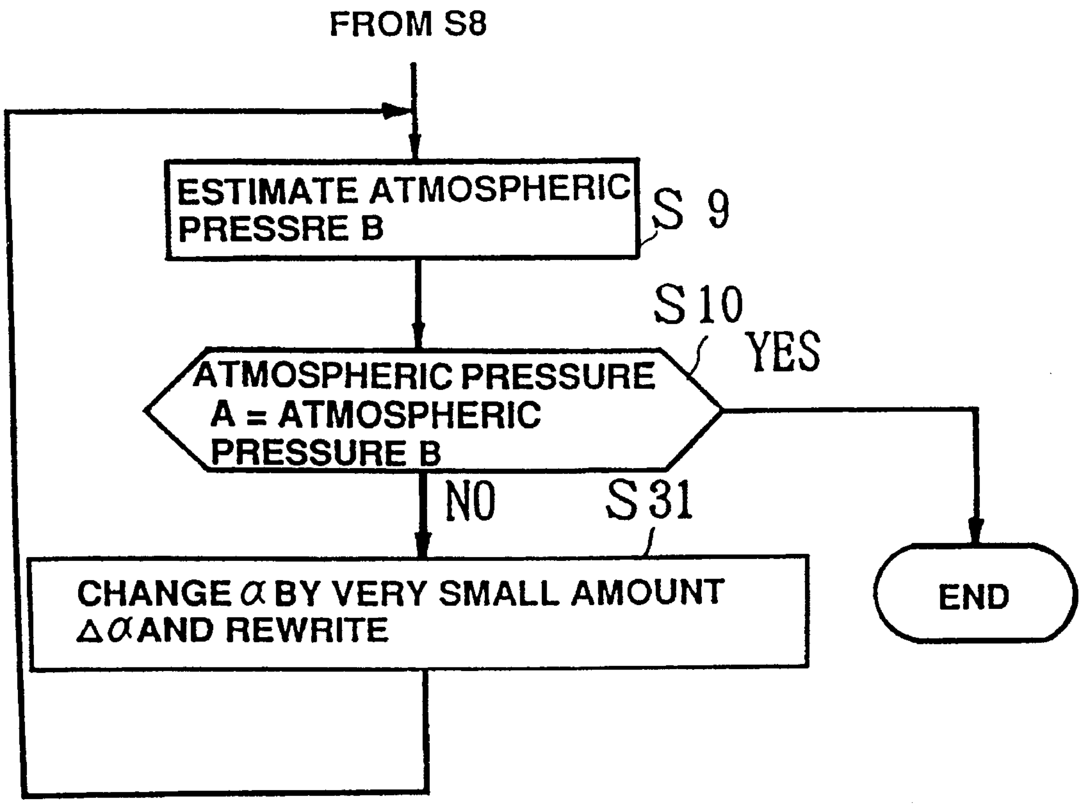
FIG. 5 is a flow chart showing a subroutine for a second learning mode for throttle valve contamination learning.

FIG. 5. shows a flow chart of a second learning mode wherein the relationship of the throttle valve opening to the output value of the throttle sensor, is learnt and corrected.

In step 31, the throttle opening corresponding to the output voltage from the throttle sensor 10 is increase or decrease corrected by a very small amount $\Delta\alpha$ according to the size relationship between the atmospheric pressure A and the atmospheric pressure B. Normally, due to contamination of the throttle valve 4, the true intake air volumetric flow rate is smaller than the intake air volumetric flow rate corresponding to the throttle valve opening detected by the throttle sensor 10. Consequently, since prior to starting learning, an intake air volumetric flow rate larger than the true intake air volumetric flow rate is used in the computation of step 9 in FIG. 3, the atmospheric pressure B exhibits a value which is larger than the atmospheric pressure A which is close to the true value.

Therefore, the value of the throttle valve opening $\alpha$ for the output value of the throttle sensor 10 is reducingly corrected by $\Delta\alpha$.

Control then returns to step 9, and the atmospheric pressure B is again estimated using the throttle valve opening $\alpha$ corrected in step 31.

In step 10 the atmospheric pressure A and the atmospheric pressure B are re-compared, and if not in agreement, then the same operation is again repeated.

When the atmospheric pressure A and the atmospheric pressure B are in agreement, the routine is terminated. At this time, with respect to the same intake air volumetric flow rate, the throttle valve opening $\alpha$ increases due to the contamination of the throttle valve compared to a situation for no contamination. Accordingly, with respect to the output value of the throttle sensor 10, the increased throttle valve opening $\alpha$ is learned and corrected so as to decrease to a throttle valve opening corresponding to conditions there were no contamination of the throttle valve. That is to say, by correcting the throttle valve opening $\alpha$ to a throttle valve opening corresponding to a situation for no throttle valve contamination, even though contamination exists, then atmospheric pressure estimation can be carried out even in the low opening region, using the learnt/corrected throttle valve opening.

Furthermore, in the case of speed change control of an automatic transmission, even if switching of the speed change pattern by estimating the atmospheric pressure is not carried out, if speed change control is carried out using the learnt/corrected throttle valve opening, then since the throttle valve opening is corrected to a value corresponding to the true intake air volumetric flow rate, setting is automatically carried out to a speed change pattern corresponding to atmospheric pressure. In this case, compared to the arrangement wherein the atmospheric pressure is estimated and the speed change pattern is switched, there is no need to switch the speed change pattern. Moreover, since the throttle valve opening is corrected continuously corresponding to changes in atmospheric pressure, and setting is carried out to an appropriate speed change pattern, then this is also beneficial for accuracy.

In addition, with an arrangement wherein the correction amount for the fuel injection quantity during transition operation is set for example by the change rate in the throttle valve opening, then setting of the correction amount for the fuel injection quantity corresponding to the intake air volumetric efficiency change corresponding to the change in the throttle valve opening $\alpha$, can be carried out to high accuracy, so that engine operating performance can be improved.

Figure 6:
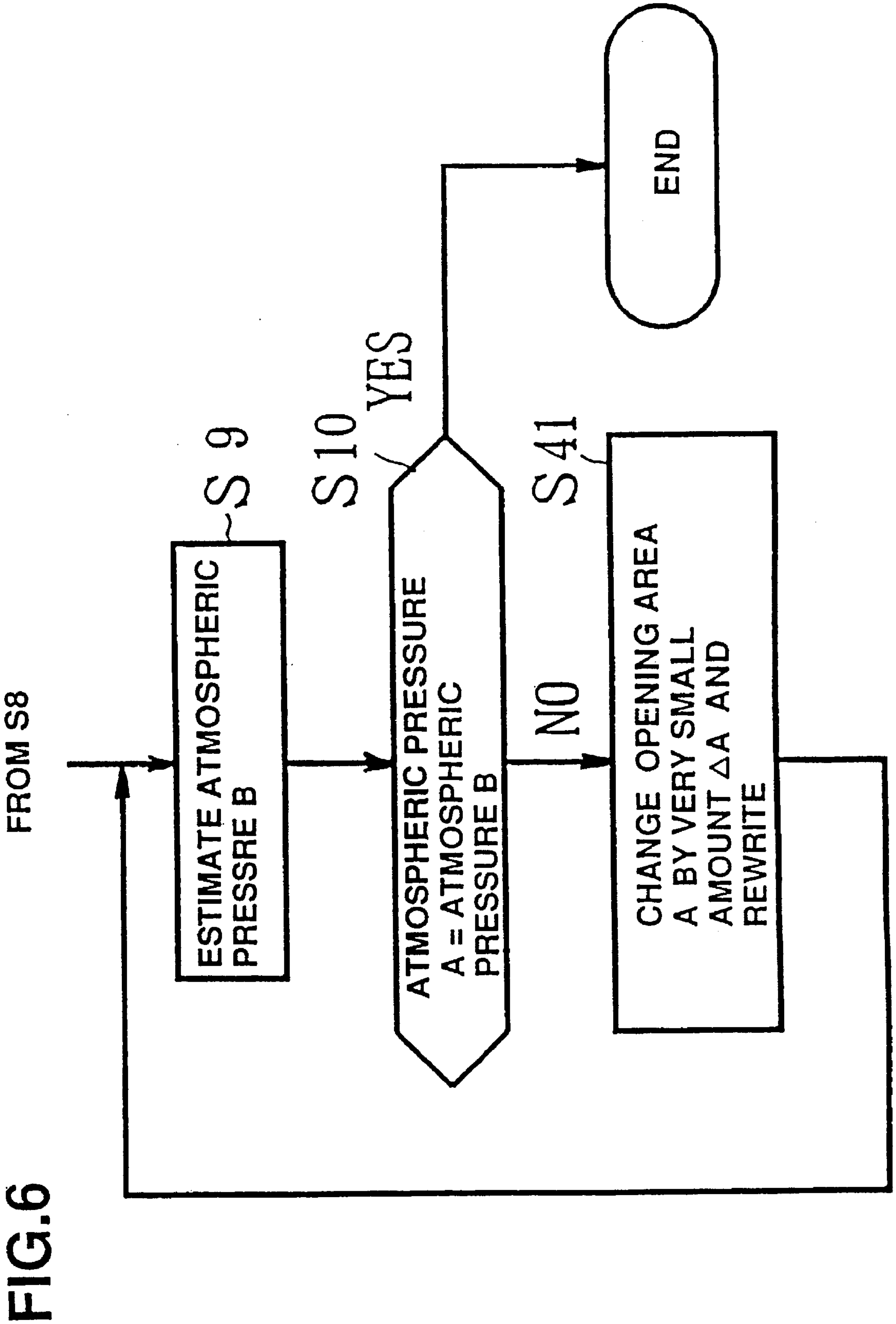
FIG. 6 is a flow chart showing a subroutine for a third learning mode for throttle valve contamination learning.

Next is a description in accordance with the flow chart of FIG. 6 of a third learning mode wherein a relationship of the throttle valve opening area to the throttle valve opening, is learnt and corrected.

This routine obtains the throttle valve opening area from a detection value of the throttle valve opening, by retrieval from a table or from a computation formula and the like, and is effective for example when setting the correction amount for the fuel injection quantity during transition operation, from for example the change rate in the opening area.

In step 41, a throttle opening area A for the detected throttle valve opening $\alpha$ corresponding to the output voltage from the throttle sensor 10, is increase or decrease corrected by a very small amount $\Delta A$ according to the size relationship between the atmospheric pressure A and the atmospheric pressure B. Normally, as mentioned before, due to contamination of the throttle valve, the atmospheric pressure B exhibits a value which is larger than the atmospheric pressure A which is close to the true value. Therefore the throttle opening area A is reducingly corrected by a very small amount $\Delta A$ so as to approach the atmospheric pressure A.

Control then returns to step 9, and the atmospheric pressure B is again estimated using the throttle opening area corrected in step 41. With this learning mode, instead of using ($\alpha$–N) Q in the atmospheric pressure estimation, the throttle valve opening $\alpha$ is converted to the throttle opening area A, and an intake air volumetric flow rate (A-N) Q obtained based on the converted throttle opening area A and the engine rotational speed N is used.

In step 10, the atmospheric pressure A and the atmospheric pressure B are re-compared, and if not in agreement, then the same operation is again repeated. When the atmospheric pressure A and the atmospheric pressure B are in agreement, the routine is terminated. At this time, with respect to the same intake air volumetric flow rate, the throttle opening area A increases due to the contamination of the throttle valve compared to a situation for no throttle valve contamination. Accordingly, with respect to the throttle valve opening $\alpha$, the increased throttle valve opening area A is learned and corrected so as to decrease to a throttle valve opening area corresponding to conditions there were no contamination of the throttle valve. That is to say, the throttle valve opening area is corrected to a throttle valve opening area corresponding to a situation for no throttle valve contamination, even though contamination exists.

Since the throttle opening area A corresponding to the true intake air volumetric flow rate is obtained in this way, then at the time of transitional operation, the setting of the correction amount for the fuel injection quantity corresponding to the intake air volumetric efficiency change corresponding to the change in the throttle opening area A, can be carried out to high accuracy, so that engine operating performance can be improved.

Now with the present embodiment, the atmospheric pressure is estimated and contamination learning is carried out when the throttle valve has changed to a low opening prior to the lapse of a predetermined time after estimation/computation of the atmospheric pressure for the high opening region of the throttle valve. However, a gravity direction sensor and the like may be provided to detect the inclination of the vehicle, and thereby detect up slope or down slope travelling, and throttle valve contamination learning carried out when the throttle valve has changed to a low opening prior to detecting up slope or down slope travelling after computation for the high opening region.

I claim:

1. A method of controlling throttle valve contamination learning comprising steps of;

respectively detecting intake air mass flow rate, the opening of a throttle valve disposed in an engine intake system, and engine rotational speed, estimating intake air volumetric flow rate based on said detected throttle valve opening and engine rotational speed, estimating atmospheric pressure at the time of a large value for said detected throttle valve opening, based on said detected intake air mass flow rate and said estimated intake air volumetric flow rate, estimating atmospheric pressure when the throttle valve opening subsequently changes to a small value while the atmospheric pressure remains virtually constant, based on said detected intake air mass flow rate and said estimated intake air volumetric flow rate, and learning and correcting a relationship between the throttle valve opening and a value related to said throttle valve opening, so that the atmospheric pressure estimated when the throttle valve opening changes to a small value while the atmospheric pressure remains virtually constant, approaches the atmospheric pressure estimated when said throttle valve opening is a large value.

2. A method of controlling throttle valve contamination learning according to claim 1, wherein said learning and correcting is carried out when the opening of the throttle valve changes to a small value within a predetermined period, after estimating the atmospheric pressure when said detected throttle valve opening is a large value.

3. A method of controlling throttle valve contamination learning according to claim 1, further comprising a step of detecting if there are up slope or down slope travelling conditions, wherein said learning and correcting is carried out when the throttle valve opening changes to a small opening while detected that there are non up slope or down slope travelling conditions, after estimating atmospheric pressure when said detected throttle valve opening is a large value.

4. A method of controlling throttle valve contamination learning according to claim 1, wherein said learning and correcting is carried out with respect to a relationship between said throttle valve opening and said intake air volumetric flow rate.

5. A method of controlling throttle valve contamination learning according to claim 1, wherein said learning and correcting is carried out with respect to a relationship between the throttle valve opening and a switching point for the speed change position of an automatic transmission.

6. A method of controlling throttle valve contamination learning according to claim 1, wherein said learning and correcting is carried out with respect to a relationship between the throttle valve opening and a fuel injection quantity correction amount during transition.

7. An apparatus for controlling throttle valve contamination learning comprising;

intake air mass flow rate detection means for detecting intake air mass flow rate, throttle valve opening detection means for detecting the opening of a throttle valve disposed in an engine intake system, engine rotational speed detection means for detecting engine rotational speed, intake air volumetric flow rate estimation means for estimating intake air volumetric flow rate, based on said detected throttle valve opening and engine rotational speed, atmospheric pressure estimation means for estimating atmospheric pressure based on the intake air mass flow rate detected by said intake air mass flow rate detection means and the intake air volumetric flow rate estimated by said intake air volumetric flow rate estimation means, and learning means for, after estimating atmospheric pressure by said atmospheric pressure estimation means when the throttle valve opening detected by said throttle valve opening detection means is a large value, learning and correcting a relationship between the throttle valve opening and a value related to said throttle valve opening, so that the atmospheric pressure estimated by said atmospheric pressure estimation means when the throttle valve opening changes to a small value while the atmospheric pressure remains virtually constant approaches the atmospheric pressure estimated when said throttle valve opening is a large value.

8. An apparatus for controlling throttle valve contamination learning according to claim 7, wherein said learning means carries out learning and correcting when the opening of the throttle valve changes to a small value within a predetermined period, after estimating the atmospheric pressure by said atmospheric pressure estimation means.

9. An apparatus for controlling throttle valve contamination learning according to claim 7, further comprising up slope/down slope travelling conditions detection means for detecting if there are up slope or down slope travelling conditions, wherein said learning means carries out learning and correcting when the throttle valve opening changes to a small opening while detected by said up slope/down slope travelling conditions detection means that there are non up slope or down slope travelling conditions, after estimating the atmospheric pressure by said atmospheric pressure estimation means.

10. An apparatus for controlling throttle valve contamination learning according to claim 7, wherein said learning means learns and corrects the intake air volumetric flow rate estimated by said intake air volumetric flow rate estimation means.

11. An apparatus for controlling throttle valve contamination learning according to claim 7, wherein said learning means learns and corrects the throttle valve opening used in speed change position switching of an automatic transmission.

12. An apparatus for controlling throttle valve contamination learning according to claim 7, wherein said learning means learns and corrects the throttle valve opening used in setting a fuel injection quantity correction amount during transition.

* * * * *